United States Patent
Somerville

(10) Patent No.: US 9,963,072 B2
(45) Date of Patent: May 8, 2018

(54) SKID STEER REARVIEW MIRROR SYSTEM AND METHOD

(71) Applicant: William Arthur Somerville, Langdon (CA)

(72) Inventor: William Arthur Somerville, Langdon (CA)

(*) Notice: Subject to any disclaimer, the term of this patent is extended or adjusted under 35 U.S.C. 154(b) by 116 days.

(21) Appl. No.: 15/060,775

(22) Filed: Mar. 4, 2016

(65) Prior Publication Data
US 2017/0253183 A1    Sep. 7, 2017

(51) Int. Cl.
| | |
|---|---|
| B60D 1/36 | (2006.01) |
| B60R 1/06 | (2006.01) |
| E02F 3/34 | (2006.01) |

(52) U.S. Cl.
CPC .............. B60R 1/06 (2013.01); E02F 3/3417 (2013.01)

(58) Field of Classification Search
CPC ..... F16C 11/00; F16M 11/10; F16M 11/2021; F16M 13/022; G02B 7/1824
USPC .......................... 280/477; 359/841, 842, 844
See application file for complete search history.

(56) References Cited

U.S. PATENT DOCUMENTS

| | | | |
|---|---|---|---|
| 1,964,873 A | 7/1934 | Dujardin | |
| 2,413,894 A | 1/1947 | Sorensen | |
| 3,977,645 A * | 8/1976 | Deely | F16C 11/00 248/278.1 |
| 4,172,638 A | 10/1979 | Freedman | |
| 4,379,568 A | 4/1983 | Kerkman | |
| 5,641,191 A * | 6/1997 | Jia | B60J 3/02 16/224 |
| D395,266 S | 6/1998 | Phillips | |
| D399,809 S | 10/1998 | Leveille | |
| D426,182 S | 6/2000 | Brown | |
| 6,409,200 B1 * | 6/2002 | Glass | B60R 1/003 224/309 |
| 6,846,036 B2 | 1/2005 | Stone | |
| 6,923,463 B1 * | 8/2005 | Ford | B60D 1/36 248/479 |
| 6,955,437 B1 * | 10/2005 | Roberts | B60D 1/36 248/467 |
| 7,216,885 B1 * | 5/2007 | Stopka | B60D 1/36 248/477 |
| 7,296,903 B2 | 11/2007 | Peterson | |
| 7,334,905 B2 | 2/2008 | Houdyshell | |
| 7,621,555 B2 * | 11/2009 | Wilkinson | B60D 1/36 280/477 |
| D716,209 S | 10/2014 | Rigolio | |

(Continued)

*Primary Examiner* — Toan To
(74) *Attorney, Agent, or Firm* — David Guerra

(57) ABSTRACT

The present invention essentially is a skid steer rearview mirror for enabling an operator to view substantially a tail swing path of the skid steer. The rearview mirror includes a support arm, a support bracket and a mirror. The support arm is attachable to a side of a skid steer, and offset from the side of the skid steer by a first distance sufficient to allow a movable lifting arm of the skid steer to travel between the support arm and the side of the skid steer. The support bracket is rotatably attachable to a free end of the support arm. The mirror is attachable to the support bracket by way of a universal joint. The support bracket may be an L-shaped bracket with a first bracket section rotatably connected to a free end of the support arm. A second bracket section is substantially parallel with a longitudinal axis of a portion of the support arm.

18 Claims, 2 Drawing Sheets

(56) References Cited

U.S. PATENT DOCUMENTS 8,864,094 B2 10/2014 Roberts et al.
2009/0180205 A1 7/2009 Kim

* cited by examiner

SKID STEER REARVIEW MIRROR SYSTEM AND METHOD

BACKGROUND OF THE INVENTION

Field of the Invention

The present invention relates to a skid steer rearview mirror system and method for use in connection with providing rearward visibility for an operator of a loader vehicle.

Description of the Prior Art

Conventional skid steer loader type vehicles have a cab portion for an operator or drive, and a pair of movable lift arms that pivot up and down along the sides of the cab. Various implements such as grading blade configurations, fork lift members, bucket members, and the like are detachable mounted to the lift arms. Skid steer vehicles have at least one pair of opposing tracks/wheels, which can be moved independently such that the skid loader can have very tight turning ability and in some cases can have a zero turning radius. Thus, while a skid steer loader is highly maneuverable, the operator must exercise care to prevent swinging the rear end of the skid loader into unseen objects or people at a site.

In such skid steer loader vehicles, the small size of the cab, the recessed position of the operator seat within the cab, and the location of the lift arms generally make it very difficult for the operator to see the behind the vehicle. Rear view mirrors have been placed within the cab of skid steer vehicles. However, the small size of the cab makes the cab interior a less than ideal location for a rear view mirror. Furthermore, placing rearview mirrors on the side of the cab is difficult because the swinging radius of the lifting arms and their close proximity to the cab.

For these and other reasons, there is a need for the present invention. While the above-described devices fulfill their respective, particular objectives and requirements, the aforementioned patents do not describe a skid steer rearview mirror system that allows providing rearward visibility for an operator of a loader vehicle.

Therefore, a need exists for a new and improved skid steer rearview mirror system that can be used for providing rearward visibility for an operator of a loader vehicle. In this regard, the present invention substantially fulfills this need. In this respect, the skid steer rearview mirror system according to the present invention substantially departs from the conventional concepts and designs of the prior art, and in doing so provide an apparatus primarily developed for the purpose of providing rearward visibility for an operator of a loader vehicle.

BRIEF SUMMARY OF THE INVENTION

In view of the foregoing disadvantages inherent in the known types of skid steer rearview mirrors now present in the prior art, the present invention provides an improved skid steer rearview mirror system, and overcomes the above-mentioned disadvantages and drawbacks of the prior art. As such, the general purpose of the present invention, which will be described subsequently in greater detail, is to provide a new and improved skid steer rearview mirror system and method which has all the advantages of the prior art mentioned heretofore and many novel features that result in a skid steer rearview mirror system which is not anticipated, rendered obvious, suggested, or even implied by the prior art, either alone or in any combination thereof.

To attain this, the present invention essentially comprises a loader vehicle rearview mirror having a support arm, a support bracket and a mirror. The support arm being attachable to a side of a loader vehicle, and offset from the side of the loader vehicle by a first distance sufficient to allow a movable lifting arm of the loader vehicle to travel between the support arm and the side of the loader vehicle. The support bracket is rotatably attachable to a free end of the support arm. The mirror is attachable to the support bracket by way of a universal joint. The mirror being located above the lifting arm when the lifting arm is in a lowest most position.

The support bracket is an L-shaped bracket with a first bracket section and a second bracket section. The first bracket section is rotatably connected to a free end of the support arm. The second bracket section is substantially parallel with a longitudinal axis of a portion of the support arm.

There has thus been outlined, rather broadly, the more important features of the invention in order that the detailed description thereof that follows may be better understood and in order that the present contribution to the art may be better appreciated.

The invention may also include a mounting plate is attached to the support arm, and has a configuration capable of being attachable to the side of the loader vehicle. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved skid steer rearview mirror system that has all of the advantages of the prior art skid steer rearview mirrors and none of the disadvantages.

It is another object of the present invention to provide a new and improved skid steer rearview mirror system that may be easily and efficiently manufactured and marketed.

An even further object of the present invention is to provide a new and improved skid steer rearview mirror system that has a low cost of manufacture with regard to both materials and labor, and which accordingly is then susceptible of low prices of sale to the consuming public, thereby making such skid steer rearview mirror system economically available to the buying public.

Still another object of the present invention is to provide a new skid steer rearview mirror system that provides in the apparatuses and methods of the prior art some of the advantages thereof, while simultaneously overcoming some of the disadvantages normally associated therewith.

Even still another object of the present invention is to provide a skid steer rearview mirror system for providing rearward visibility for an operator of a loader vehicle.

Lastly, it is an object of the present invention to provide a new and improved method of equipping a loader vehicle with a rearview mirror for enabling an operator in the loader vehicle to view substantially a tail swing path of the loader vehicle. A mounting plate of the rearview mirror is positioned on a side of the loader vehicle adjacently below an exposed cylinder rod of a hydraulic ram associated with a movable lifting arm of the loader vehicle. A support arm of the rearview mirror is positioned so as to be offset from the side of the loader vehicle by a first distance sufficient to allow the lifting arm of the loader vehicle to travel between the support arm and the side of the loader vehicle. The support arm being attached to the mounting plate. The rearview mirror is rotated so that at least a portion of the support arm is at an angle toward a front of a cab of the loader vehicle so that a mirror is positioned forward of the operator when the operator is in the cab. The mirror is attachable to a support bracket by way of a universal joint. The support bracket is rotatably attachable to a free end of the support arm. The mirror is located above the lifting arm when the lifting arm is in a lowest most position.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
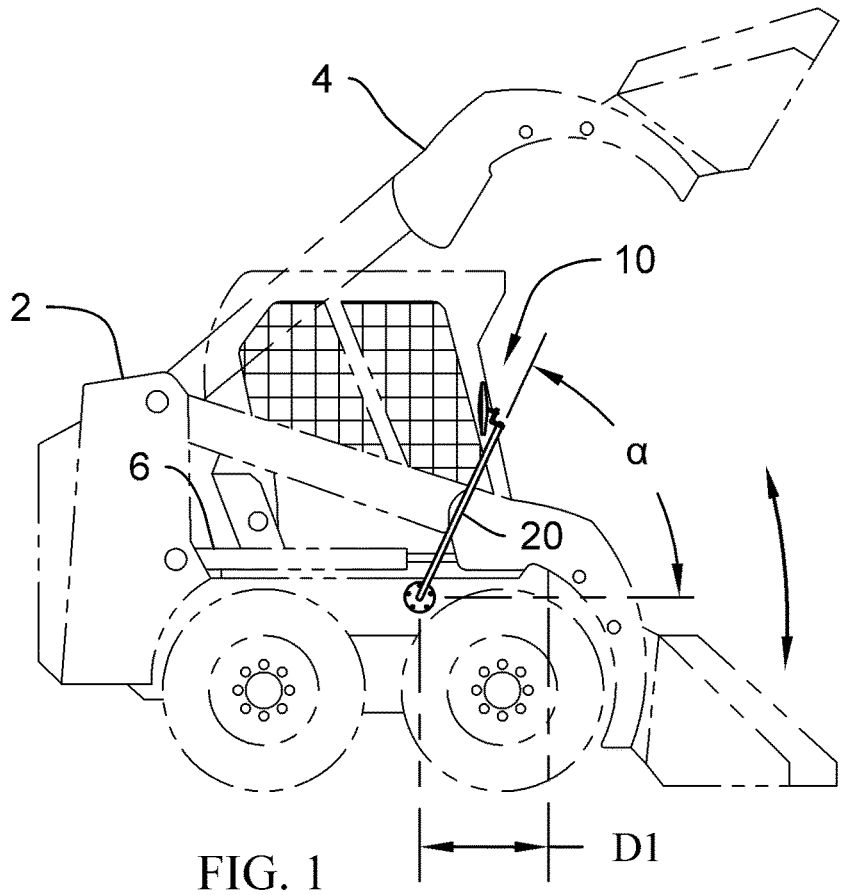
FIG. 1 is a side planar view of an embodiment of the skid steer rearview mirror system constructed in accordance with the principles of the present invention, with the phantom lines depicting environmental structure and forming no part of the claimed invention.

Referring now to the drawings, and particularly to FIGS. 1-4, an embodiment of the skid steer rearview mirror system and method of the present invention is shown and generally designated by the reference numeral 10.

Figure 2:
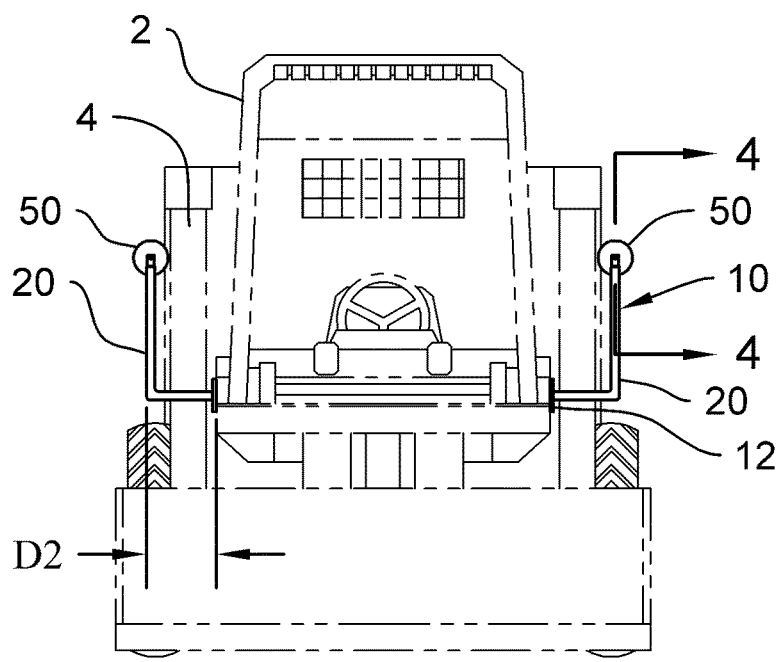
FIG. 2 is a front elevational view of the skid steer rearview mirror system of the present invention.

In FIG. 1, a new and improved skid steer rearview mirror system 10 of the present invention for providing rearward visibility for an operator of a skid steer loader vehicle 2 is illustrated and will be described. Referring to FIGS. 1 and 2, there is generally illustrated therein a skid steer loader vehicle 2 having features that are examples of inventive aspects in accordance with the principles of the present disclosure. The loader vehicle 2 is shown to include a left and right mirror system 10, having features that are examples of inventive aspects in accordance with the principles of the present disclosure.

Various embodiments of the present invention can be implemented on skid steer loaders. With this terminology in mind, FIG. 1 illustrates a side view of the loader vehicle 2 according to one embodiment of the present invention. Loader vehicle 2 includes a cab capable of receiving an operator, a pair of lifting arms 4 on either side of the cab, and movement means or hydraulic rams 6 operably connected to each lifting arm and configured to raise and lower the lifting arms.

In FIGS. 1 and 2, the loader vehicle 2 is depicted as a skid steer vehicle. It will be understood that the skid steer vehicle is simply representative of one embodiment of the loader vehicle 2 that can be used to practice the principles of the present disclosure. Other motor vehicles such as, but not limited to, fork lifts, tractors with front end loaders and the like can also be used. The principles of the present disclosure can be used with both wheeled vehicles such as skid steer loaders and tracked vehicles such as bulldozers. It can be appreciated that the loader vehicle 2 and mirror system 10 may be incorporated together as a loader vehicle and mirror system.

More particularly, each skid steer rearview mirror system 10 is attached to a side of the cab or frame of the loader vehicle 2 below the lifting arms 4 and hydraulic rams 6. The mirror system 10 has a mounting plate 12, a support arm 20 extending from the mounting plate 12, and a mirror 50 positioned at an end of the support arm 20 opposite the mounting plate 12.

The mounting plate 12 is attached to the side of the loader vehicle 2 and located at a distance D1 from a front of the cab or frame, with D1 being sufficient to clear any enlarged sections of the lifting arms. The distance D1 can be from 1"-40" (inches), with a distance of 17.5" being sufficient to place the mounting plate 12 adjacently below an exposed cylinder rod of the hydraulic ram 6 and a connection point of exposed cylinder rod with the lifting arm 4, as best illustrated in FIG. 1.

The support arm 20 extends upwardly from the mounting plate 12 at an angle α toward the front of the cab so that the mirror 50 is in-line or parallel with a front door frame of the cab. The angle α can be any angle, in relation to a longitudinal axis of the loader vehicle 2, sufficient to locate the end of the support arm 20, connected to the mirror 50, to be in-line or parallel with the front door frame of the cab, dependent on the D1 and the length of the support arm 20. The angle α can be from 10°-80°, with an angle of 65° being sufficient to located the end of the support arm 20 in-line or parallel with the front door frame of the cab with D1 being 17.5".

The support arm 20 extends out from the side of mounting plate 12 and thus the side of the loader vehicle 2 a distance D2. The distance D2 is less than a distance from the mounting plate 12 to an exterior side of a wheel or track on the same side, as best illustrated in FIG. 2. It can be appreciated that D2 locates both the left and right side mirror systems 10 within the wheel base of loader vehicle 2, thereby preventing contact of the mirror system 10 with buildings and the like and thus preventing damage to the mirror system 10.

It can be appreciated that the support arm 20 may include telescopic sections, a hinge and/or articulating joints to provide additional adjustability in positioning the mirror 50.

Figure 3:
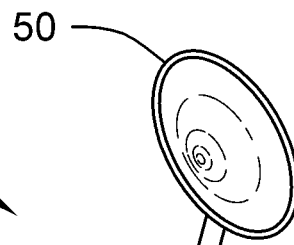
FIG. 3 is a perspective view of the skid steer rearview mirror system of the present invention.

Referring to FIG. 3, the mounting plate 12 is attached to the side of the loader vehicle 2 by securing means such as, but not limited to, bolts, screws, rivets, welding, magnetic, adhesives, clips, clamps and the like. For exemplary purposes, the mounting plate 12 can include through holes 14 configured to receive a fastener 16 associated with a washer 18.

The support arm 20 features a first arm section 22 and a second arm section 24. The first arm section 22 extends substantially horizontally from the mounting plate 12 the distance D2. It can be appreciated that the first arm section 22 can be any angle so long as it extends the distance D2. The second arm section 24 extends substantially vertically from the first arm section 22 at substantially 90°, and is rotated about the first arm section 22 so as to provide the angle α.

Figure 4:
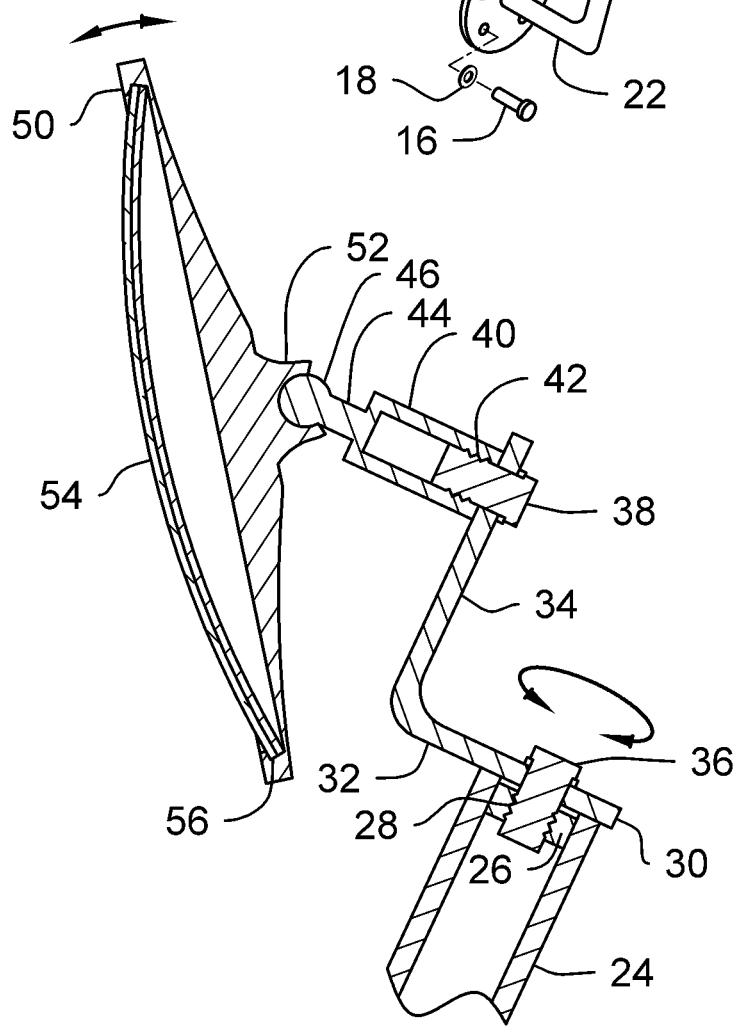
FIG. 4 is a cross-sectional view of the skid steer rearview mirror system of the present invention taken along line 4-4 in FIG. 2.

Referring to FIG. 4, a fixing member or means 26 including an internally threaded feature 28 is located at a free end of the second arm section 24. The fixing means 26 can be a fastening nut fitted into a hollow portion or recess of the free end of the second arm section 24.

A support bracket 30 connects the mirror 50 to the free end of the second arm section 24. The support bracket 30 includes a first bracket section 32 and a second bracket section 34. A fastener 36 is received through a hole defined in the first bracket section 32 and engages with the threaded feature 28 of the fixing means 26. It can be appreciated that the fastener 36 can be, but not limited to, a bolt, screw, rivet, magnetic, clip, clamp, pin and the like. The hole the first bracket section 32 and the fastener 36 allow the support bracket 30, and thus the mirror 50, to rotate about the second arm section 24. The first bracket section 32 has a longitudinal axis substantially perpendicular to a longitudinal axis of the second arm section 24, and thus perpendicular to angle α. It can be appreciated that the support bracket 30 is generally an L-shaped bracket.

The second bracket section 34 extends from the first bracket section 32 at substantially 90°, and thus parallel with the longitudinal axis of the second arm section 24. A hole is defined adjacent a free end of the second bracket section 34 configured to receive a portion of a fastener 38.

An extension member 40 attaches the mirror 50 to the second bracket section 34 by way of a universal joint, such as but not limited to, a ball and socket. The extension member 40 includes a main body featuring a first end section defining an internally threaded feature 42 configured to engage with a portion of the fastener 38, thereby securing the extension member 40 to the second bracket section 34. It can be appreciated that the fastener 38 can be, but not limited to, a bolt, screw, rivet, magnetic, clip, clamp, pin and the like.

The extension member 40 further features a second end section which includes a stem 44 extending from the main body opposite the internally threaded feature 42, and a ball located at a free end of the stem 44. It can be appreciated that the extension member 40 or the stem 44 and ball 46 may be integrally formed with support bracket 30

The mirror 50 includes a socket 52 configured to receive at least a portion of the ball 46, thereby allowing the mirror 50 to swivel about the ball 46. A mirror surface 54 is received and retained with a peripheral notch, edge, slot and the like 56. The mirror surface 54 can be, but not limited to, a wide angled mirror, convex mirror, fish eye mirror, bi-focal mirror, multiple mirrors and the like.

Optionally, the mirror 50 can include heating, defrosting, wiper, laser, distance, light, compass, camera, motor and/or sensor systems. The mirror 50 can also include a sun visor and/or tinting.

It can be appreciated that the loader vehicle 2 and the mirror system 10 can together form part of the present invention.

In use, it can now be understood that the mirror system 10 can be equipped on a loader vehicle 2 to enable an operator in the loader vehicle 2 to visualize substantially an entirety of a tail swing path on either the rear and/or the side of the loader vehicle 2. To install each of the mirror system 10, a user would install the mirror 50 to the extension member 40 so that the ball 46 is received in the socket 52. The extension member 40 is then snugly secured to the second bracket section 34 by way of the fastener 38. Secure the first bracket section 32 to the second arm section 24 by way of fastener 36.

Position the lifting arms 4 of the loader vehicle 2 in their lowest or fully lowered position. After which, position the mounting plate 12 just below the exposed cylinder rod of the hydraulic ram 6 at the distance D1. At this location, rotate the mirror system 10 so that the second arm section 24 is orientated at angle α. Mark on the side of the loader vehicle 2 the location of each hole 14, and then drill a hole at each marked location. The drilled holes can be tapped to engageably receive the fastener 16.

After which, position and secure the mounting plate 12 to the drilled holes with the fasteners 16 so that the second arm section 24 is at angle α. To facilitate the marking and drilling of the holes, the lifting arms 4 can be raised.

While embodiments of the skid steer rearview mirror system have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, alloy, composites or carbon fiber may be used for the above mounting plate, support arm, support bracket and/or extension member. And although providing rearward visibility for an operator of a loader vehicle have been described, it should be appreciated that the skid steer rearview mirror system herein described is also suitable for any vehicle requiring a side rearview mirror that is offset from a portion of the vehicle to provide clearance of a moving member.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rearview mirror for a loader vehicle, said rearview mirror comprising:
   a support arm attachable to the loader vehicle, said support arm being exteriorly offset from a side of the loader vehicle by a first distance sufficient to allow a movable lifting arm of the loader vehicle to travel between said support arm and the side of the loader vehicle;
   a support bracket rotatably attachable to a free end of said support arm; and
   a mirror attachable to said support bracket by way of a universal joint, said mirror being located above the lifting arm when the lifting arm is in a lowest most position; and
   a mounting plate attached to said support arm, said mounting plate has a configuration capable of being attachable to the side of the loader vehicle;
   wherein said support arm includes a first arm section and a second arm section, said first arm section extending outwardly from said mounting plate by said first distance, said second arm section transitioning from said first arm section at an angle toward a front panel of a cab of the loader vehicle so that said mirror is positionable forward of an operator in the cab.

2. The rearview mirror of claim 1, wherein said universal joint is a ball and a socket.

3. The rearview mirror of claim 1, wherein said mounting plate has a configuration capable of being located on the side of the loader vehicle at a second distance from a front of the loader vehicle.

4. The rearview mirror of claim 1, wherein said support bracket is an L-shaped bracket with a first bracket section rotatably connected to a free end of said second arm section, and a second bracket section substantially parallel with a longitudinal axis of the said second arm section.

5. The rearview mirror of claim 4, wherein said free end of said second arm section defines an internally threaded feature having a configuration capable of engaging with a portion of a first fastener passing through a first bracket section hole defined through said first bracket section, said first bracket section hole has a configuration capable of allowing said support bracket to rotate about said first fastener.

6. The rearview mirror of claim 5, wherein said internally threaded feature of said free end of said second arm section is a fastening member including said internally threaded feature, said fastening member being fitted adjacent to said free end of said second arm section.

7. The rearview mirror of claim 6, wherein said fastening member being fitted in a hollow interior of at least a portion of said free end of said second arm section.

8. The rearview mirror of claim 7, wherein said universal joint is a ball and a socket.

9. The rearview mirror of claim 8 further comprising an extension member including a first end section attachable to said second bracket section, and a second end section featuring said ball.

10. The rearview mirror of claim 9, wherein said first end section of said extension member defines an internally threaded feature having a configuration capable of engaging with a portion of a second fastener passing through a second bracket section hole defined through said second bracket section.

11. The rearview mirror of claim 10, wherein said second end section of said extension member further includes a stem opposite said internally threaded feature, wherein said ball is located at a free end of said stem, said stem having a width smaller than a diameter of said ball.

12. The rearview mirror of claim 11, wherein said mirror including a frame, and a convex mirror surface, said frame featuring said socket, said socket having a configuration capable of swivelably receiving a portion of said ball.

13. The rearview mirror of claim 1, wherein said support bracket is an L-shaped bracket with a first bracket section rotatably connected to a free end of said support arm, and a second bracket section substantially parallel with a longitudinal axis of a portion of said support arm.

14. The rearview mirror of claim 13, wherein said universal joint is a ball and a socket.

15. The rearview mirror of claim 14 further comprising an extension member including a first end section attachable to said second bracket section, and a second end section featuring said ball.

16. The rearview mirror of claim 15, wherein said mirror including a frame, and a convex mirror surface, said frame featuring said socket, said socket having a configuration capable of swivelably receiving a portion of said ball.

17. A loader vehicle and rearview mirror system comprising:
   a loader vehicle comprising a cab, at least one movable lifting arm, and at least one hydraulic ram operably connected to said lifting arm and configured to raise and lower said lifting arm; and
   at least one rearview mirror comprising:
      a support arm attachable to said loader vehicle, said support arm being exteriorly offset from a side of said loader vehicle by a first distance sufficient to allow said lifting arm to travel between said support arm and said side of said loader vehicle;
      a support bracket rotatably attachable to a free end of said support arm; and
      a mirror attachable to said support bracket by way of a universal joint, said mirror being located above said lifting arm when said lifting arm is in a lowest most position; and
      a mounting plate attached to said support arm, said mounting plate has a configuration capable of being attachable to the side of the loader vehicle;
      wherein said support arm includes a first arm section and a second arm section, said first arm section extending outwardly from said mounting plate by said first distance, said second arm section transitioning from said first arm section at an angle toward a front panel of a cab of the loader vehicle so that said mirror is positionable forward of an operator in the cab.

18. A method of equipping a loader vehicle with a rearview mirror for enabling an operator in the loader vehicle to view substantially a tail swing path of the loader vehicle, said method comprising the steps of:
   a) positioning a mounting plate of said rearview mirror on a side of the loader vehicle adjacently below an exposed cylinder rod of a hydraulic ram associated with a movable lifting arm of the loader vehicle;
   b) positioning a support arm of said rearview mirror to be offset from the side of the loader vehicle by a first distance sufficient to allow the lifting arm of the loader vehicle to travel between said support arm and the side of the loader vehicle, said support arm being attached to said mounting plate;
   c) rotating said rearview mirror so that at least a portion of said support arm is at an angle toward a front of a cab of the loader vehicle so that a mirror is positioned forward of the operator when the operator is in the cab, said mirror being attachable to a support bracket by way of a universal joint, said support bracket being rotatably attachable to a free end of said support arm; and d) locating said mirror above the lifting arm when the lifting arm is in a lowest most position.

\* \* \* \* \*